United States Patent Office 3,481,318
Patented Dec. 2, 1969

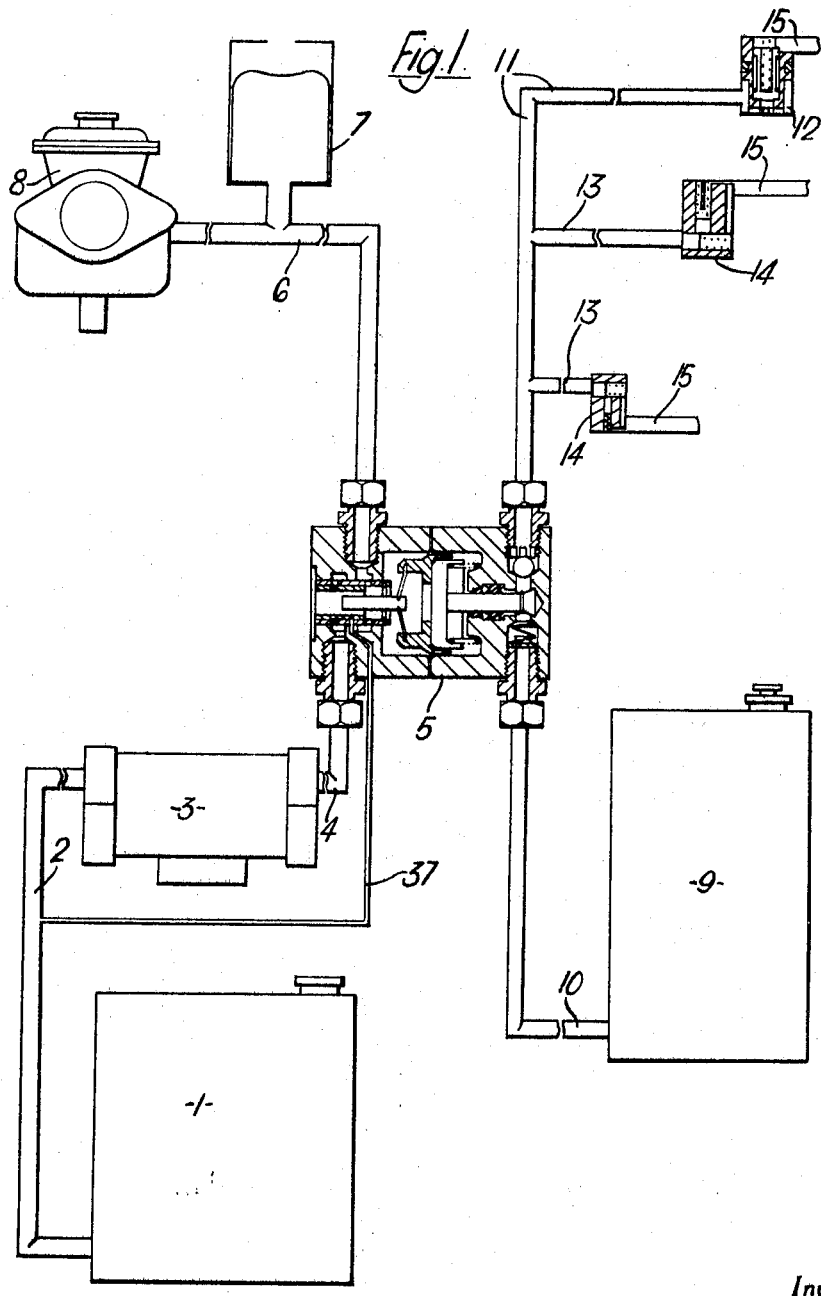

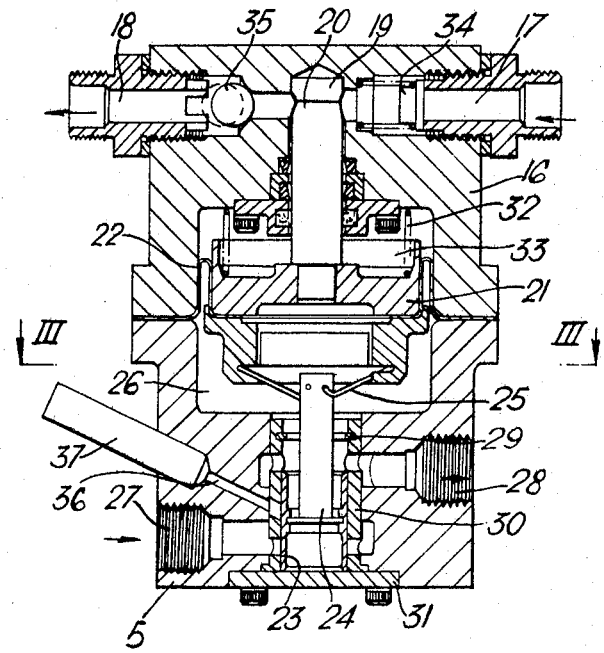
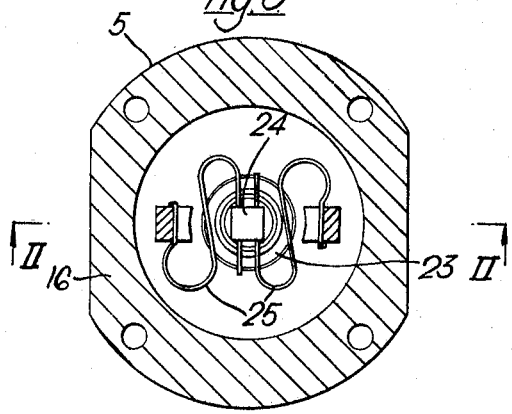

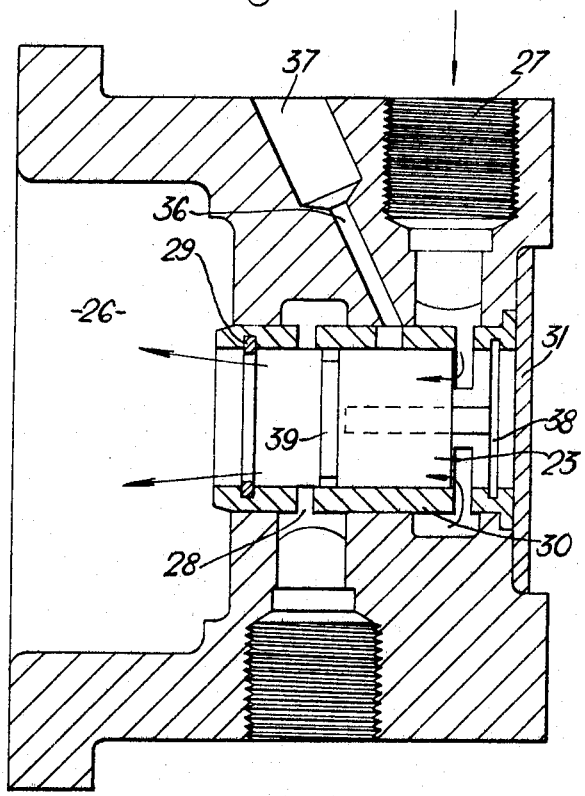

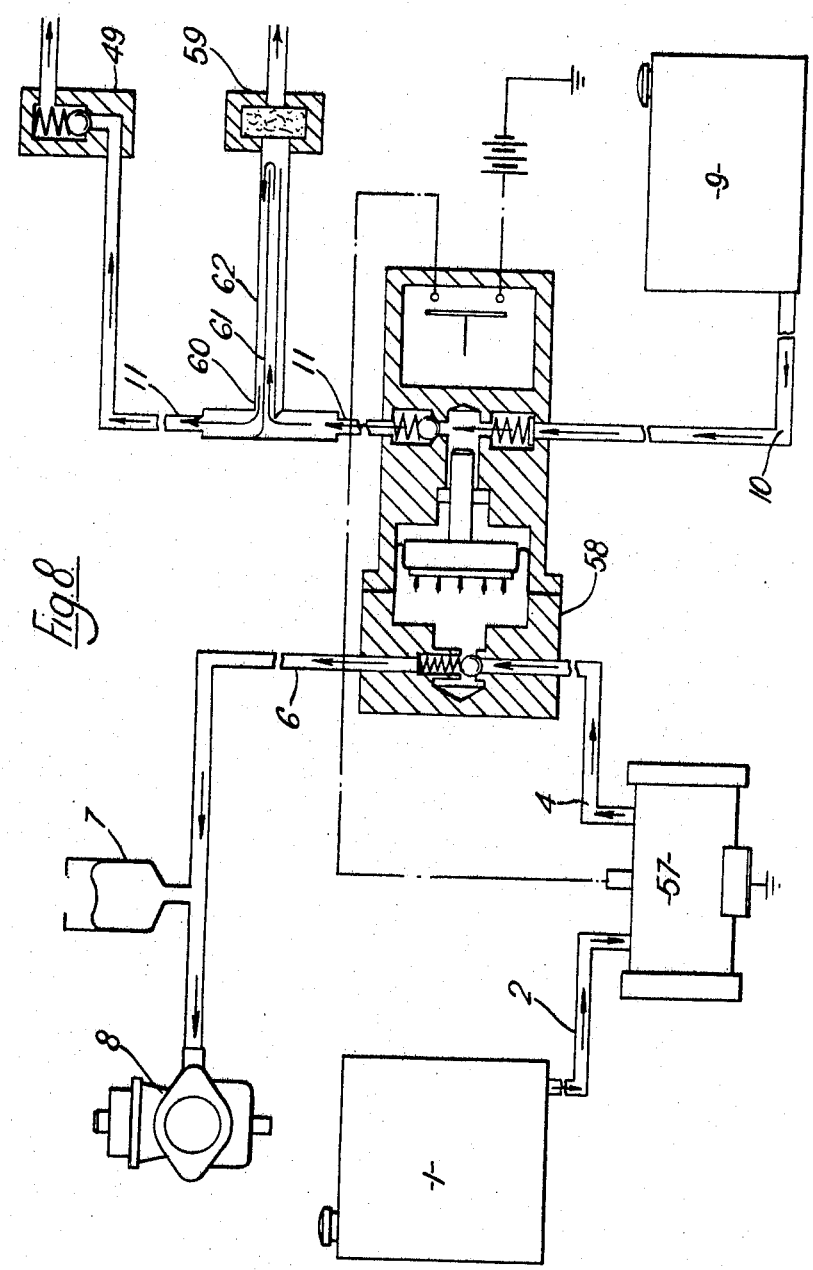

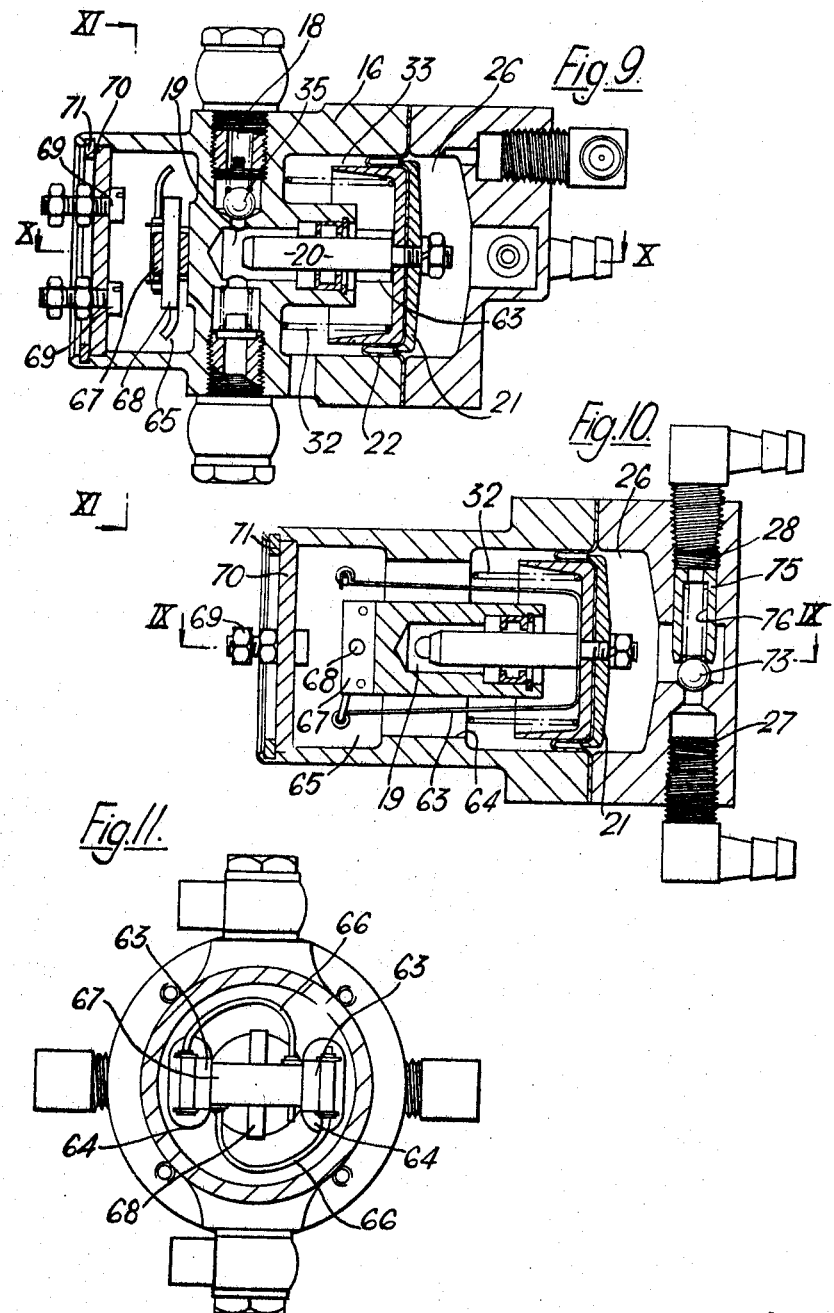

3,481,318
FLUID FLOW SYSTEMS
Alan Wycliffe Sparrow and James Anthony Kane, Peterborough, England, assignors to Perkins Engines Limited
Filed Apr. 7, 1966, Ser. No. 540,905
Claims priority, application Great Britain, Apr. 10, 1965, 15,334/65
Int. Cl. F01m 1/16; G05d 11/02
U.S. Cl. 123—196    13 Claims

ABSTRACT OF THE DISCLOSURE

An engine lubricating pump and control operated by the fuel flow to the engine so as to supply lubricating oil to the engine at a rate which is a function of the fuel flow rate. The pump includes a motor operator which is operated by fuel under pressure and which is controlled either by a valve operable with the pump or by on-off control of the fuel pump itself.

---

This invention relates to power plants including an internal combustion engine.

According to the present invention we provide a power plant comprising an internal combusion engine having a fuel intake connected to a source of fuel under pressure, a source of lubricant connected to a lubricant intake, and flow co-relating means adapted to be actuated by said fuel under pressure so as to deliver said fuel to said engine according to the engine's requirements, and so as to deliver lubricant to said lubricant intake at a rate of flow which is a predetermined function of the rate of flow of said fuel.

Also, according to the present invention, we provide a metering unit comprising a housing, a first bore in said housing, a first piston fluid-tightly slidable in said first bore, an entry to said first bore communicable with a source of pressure fluid, and an exit from said first bore, said entry and exit being disposed on opposite sides of said first piston, a first spring urging said first piston towards said entry, a second bore in said housing intersecting said first bore intermediate said entry and exit, a second piston fluid-tightly slidable in said second bore, a second spring urging said second piston towards said first bore, so that on the application of pressure fluid to said first piston through said entry, said first piston is moved against the urging of said first spring to permit pressure fluid to enter said second bore and to move said second piston, and on the removal of said application of pressure fluid, said first spring moves said first piston initially to close said second bore at said intersection to trap fluid therein and subsequently to pass said intersection and so to open said second bore to allow the trapped fluid to be moved by said second piston under the influence of said second spring into said first bore and through said exit.

Further, according to the present invention, we provide apparatus for co-relating the flow of a first fluid with at least a second fluid, comprising at least one fluid pump for said second fluid driven by a motor responsive to the flow of said first fluid, said pump comprising a pump body, a pump chamber within said pump body, a second fluid inlet and a second fluid output in communication with said pump chamber, a pump plunger reciprocable in said pump chamber to draw in a predetermined quantity of said second fluid through said second fluid inlet on one stroke and to expel said quantity of said second fluid through said second fluid output on the return stroke, said motor comprising a motor body, a motor chamber within said motor body, an inlet for said first fluid and an outlet for said first fluid in communication with said motor chamber, a motor plunger reciprocable within said motor chamber, said first fluid inlet and outlet being disposed on the same side of said motor plunger, a spring in said motor chamber urging said motor plunger towards said first fluid inlet and outlet said motor body being fixed relative to said pump body and said motor plunger being connected to said pump plunger for reciprocation therewith, said plungers being movable in one direction by successive applications of said first fluid under pressure to said motor and in the opposite direction by said spring.

Embodiments of the invention will now be described, by way of example, with reference to the accompanying drawings, in which:

FIG. 1 is a diagrammatic view of one embodiment of apparatus for metering fluid flow and according to the present invention.

FIGS. 2 and 3 are cross-sectional views through part of the apparatus shown in FIG. 1, on lines II—II and III—III respectively.

FIGS. 4 and 5 are enlarged views of parts of FIG. 2.

Figure 6A:
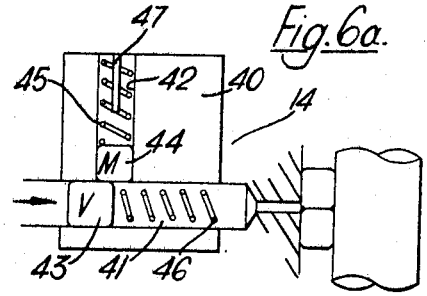

FIGS. 6a, b, c and d are diagrammatic views showing the sequence of operation of part of the apparatus.

Figure 7A:
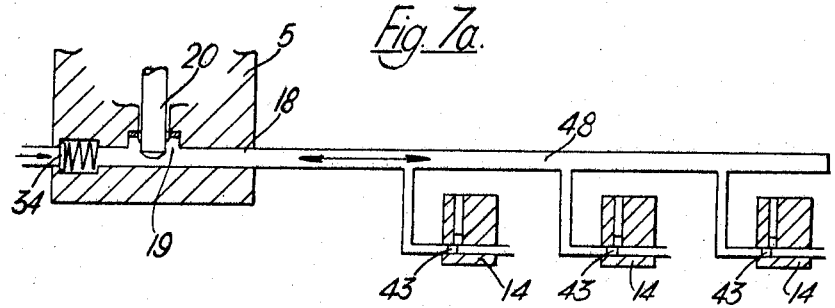

FIGS. 7a, b and c are diagrammatic views showing modifications of the apparatus.

FIG. 8 is a diagrammatic view of another embodiment of the apparatus according to the invention.

FIGS. 9, 10 and 11 are three mutually perpendicular cross-sectional views of parts of the apparatus shown in FIG. 8 on the lines IX, X and XI respectively.

Referring to the embodiments of the invention shown in FIG. 1, a power plant including an internal combustion engine (not shown has a fuel tank 1, a fuel pipe line 2, a mechanically or electrically driven fuel lift pcmp 3, a pipe line 4, flow co-relating means in the form of a pulsator unit 5 (which incorporates motor means and pump means) a pipe line 6, a fuel reservoir or accumulator 7 and a carburettor 8. Fuel is lifted from the tank 1 by the pump 3 and delivered to the carburettor 8 in known manner except for the presence of the pulsator unit 5 between pipes 4 and 6. The system also includes a lubricating oil tank 9, an oil pipe 10 entering the pulsator unit 5, an oil pipe 11 leaving the pulsator unit 5 and leading to a two stage valve 12. Oil pipes 13 are branched off from pipe 11 and these lead to metering units 14. Pipes 15 lead from the metering units to regions or parts which require lubrication. The passage of fuel through the pulsator causes oil to be transferred from the oil tank 9 to the metering units 14 and the two stage valve 12.

In FIGS. 2 and 3 there are shown cross-sections of the pulsator unit 5 shown in FIG. 1. The main components of the pulsator unit 5 are a housing 16, an oil inlet 17 and an oil outlet 18, an oil chamber 19, a piston 20 movable into and out of the oil chamber 19 to vary the size of the latter, a plunger 21 secured to the piston 20 and to a rolling lobe diaphragm 22 secured at its outer periphery to the housing 16, and a valve member 23 having a link 24 connected to the plunger 21 by a pair of S-shaped toggling spirngs 25 (see FIG. 3). The valve member 23 and link 24 are movable in a fuel chamber 26 having a fuel inlet 27 and a fuel outlet 28, the valve member 23 being operative to close one or the other. The valve member 23 is limited in its movement at one end by a spring ring 29 secured in a sleeve 30 and at the other end by a plate 31 which holds the sleeve 30 in place.

A return spring 32 placed in a ventilated chamber 33 between the housing 16 and the plunger 21, urges the latter in a downward direction as seen in FIG. 2. The oil inlet 17 and outlet 18 are provided with non-return valves 34 and 35 respectively in the unit 5. The non-return valve 35 may be dispensed with in certain arrangements of the apparatus. A leak passage 36 is formed in the housing and connects with a fuel pipe 37 (FIGS. 1 and 2) leading to the pipe 2.

Reciprocating movement of the piston 20 and plunger 21 causes oil to be drawn into the chamber 19 through the inlet 17, and discharge through the outlet 18, the piston 20 acting as pump means. The motor means is constituted by the plunger 21 which, on admission of pressurised fuel through the fuel inlet 27, moves upwards to the position seen in FIG. 2 whereat the toggle springs 25 flip the valve member 23 to the position seen in FIGS. 2 and 5. In this position of the valve member 23, the inlet 27 is closed and the fuel outlet 28 is opened, permitting the spring 32 to urge the plunger in a direction to expel fuel through pipe 6 to the carburettor 8 or the reservoir 7. When the plunger 21 in its downward movement again causes the toggle springs 25 to flip the valve 23 upwards against the ring 29, the condition seen in FIG. 4 obtains; that is, the chamber 26 is exposed to pressurised fuel and the plunger 21 moves upwards again to begin another cycle. The rate at which the discharge of fuel from the pulsator occurs is governed by the carburettor fuel demand, but the rate at which the chamber 26 is charged with fuel is much faster than the discharge rate.

Figure 5:
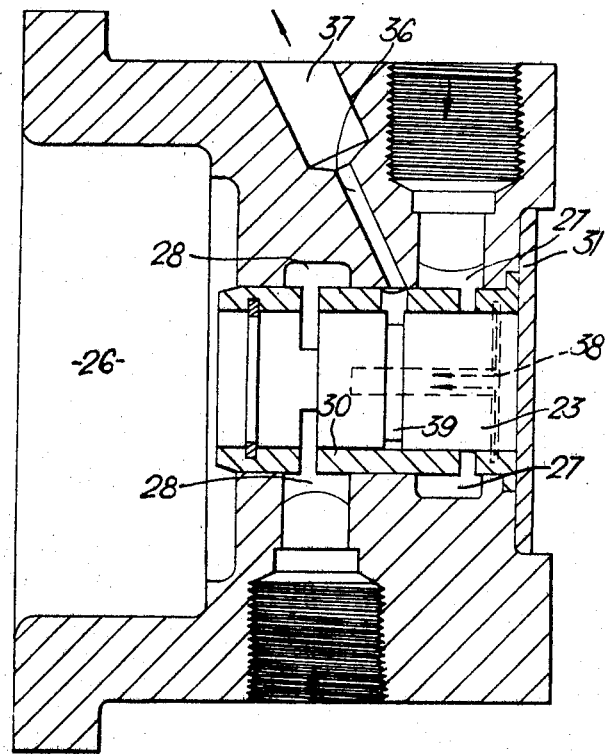

When the chamber 26 is charged, the chamber 19 is discharged, the amount of fuel per stroke bearing a fixed ratio to the amount of oil per stroke. If the valve member 23 is a good sliding fit in the sleeve 30 and no leakage of fuel occurs, a substantially constant fuel to oil ratio will be obtained. However, as the valve member 23 must slide freely due to the light forces exerted by the toggle springs, must be cheap to make and be able to operate though the fuel may contain some dirt, close sliding fit is not desirable. The fuel lift pump 3 continues to pressurise fuel in the fuel inlet 27 even though the latter is closed by the valve member 23 (FIG. 5). Fuel could therefore leak past the valve member into the chamber 26 and stop the plunger 21 in its discharge stroke. This is undesirable and is prevented by providing drain grooves 38 and 39 which channel leaking fuel into the leak passage 36, there to be conveyed back to the tank or pipe 2.

The metering units 14 shown in FIG. 1 are enlarged in FIGS. 6a, b, c and d to show the manner of metering fluid.

A metering unit 14 has a housing 40 with a feed passage 41 extending through it and a metering passage 42 branched off from the feed passage at a point intermediate its ends. Feed passage 41 connects with the pulsator 5 at its left hand end as seen in FIG. 6 while the right hand end communicates with a bearing which requires lubrication. Short cylindrical pistons 43 and 44 are positioned in passages 41 and 42 respectively. A spring 45 urges the piston 44 towards feed passage 41 and a spring 46 urges the piston 43 towards the left. An adjustable stop 47 limits the travel of piston 44 in one direction. The spring 45 is weaker than spring 46 in comparison with the cross sectional areas of the bores 42 and 41 respectively.

Figure 6B:
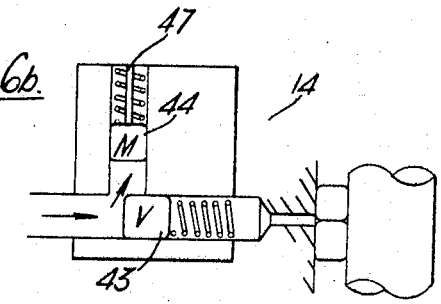
Figure 6C:
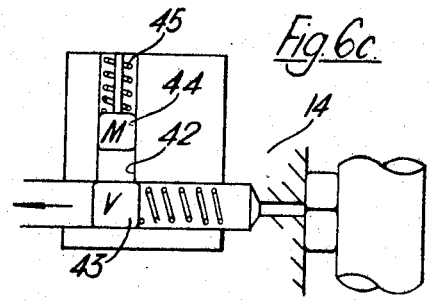
Figure 6D:
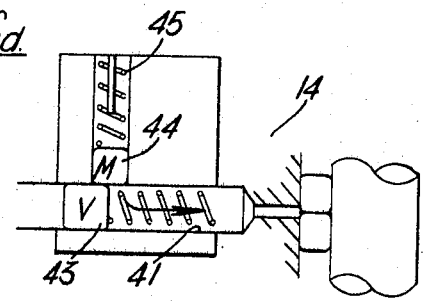

As the oil pressure at the left hand end of feed passage 41 builds up due to the action of the pulsator, the piston 43 is displaced to the right until it uncovers passage 42 whereupon the pressurised fluid will displace the piston 44 back onto its stop 47 (see FIG. 6b). It is essential that the spring 45 should be weak enough to permit this, otherwise the metering of the fluid may not be consistently accurate. As the peak pressure of the pulse passes, the piston 43 will return and will close the metering passage 42 trapping a quantity of fluid therein the spring 45 being too weak to eject fluid into passage 42 to the left of piston 43 before the passage is closed (see FIG. 6c). Further reduction in the pressure of fluid from the pulsator permits the piston 43 to move on and again uncover passage 42 (see FIG. 6d). The spring 45 and piston 44 then eject the trapper fluid into the passage 41 and force it along to the bearing which requires lubrication. The piston 44 is prevented from falling out of the passage 42 by abutment against the piston 43. When a further pressure pulse is applied to the metering unit 14, the above described cycle is repeated.

For each and every pulse applied to the metering unit, an unvarying quantity of fluid, in this case lubricating oil, is passed onto the bearing. Since, in the case of the particular form of the apparatus shown in FIG. 1 where it is applied, for example, to a two stroke internal combustion engine, the number of pulses is proportional to the rate at which fuel is being consumed by the engine; hence the rate at which oil is metered to various bearings is approximately proportional to the power developed by the engine. This is a very desirable manner in which to meter lubricating oil because, when the engine is rotating at high speed under coasting conditions, the amount of oil being used is at a minimum because little fuel is used. Also, when the engine is exerting high torque at low speed, as when moving a vehicle from rest, the fuel flow rate to the engine will be high, and therefore the lubricating rate will be high, which is beneficial when the engine is heavily loaded.

As will be seen in FIGS. 7a, b and c, the pulsator 5 and metering units 14 can be employed in several arrangements.

FIG. 7a shows, in diagrammatic form the chamber 19 and piston 20 of the pulsator unit 5 together with the oil inlet non-return valve 34 but without the non-return valve 35. The outlet 18 of the pulsator 5 is connected to a pipe or conduit 48 which is closed at the end remote from the outlet. Any suitable number of metering units 14 are branched off from the conduit 48. The oil displacement from chamber 19 by the piston 20 must be sufficient to provide an adequate amount of oil for all of the metering units which are fed. As the piston 20 develops a pulse, oil flows out to the metering units 14 and these are charged. Any oil surplus to the charging requirements of the metering units is displaced back to the chamber 19 by the combined action of the pulsator piston 20 and the pistons 43 of the metering units. Fresh oil to fill the chamber 19 completely is drawn in past the inlet non-return valve 34. The quantity of fresh oil is of course equal to the quantity of oil metered by the units 14.

Figure 7B:
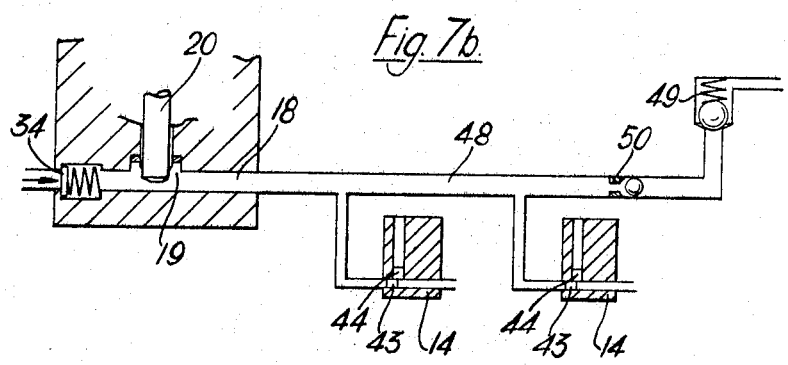

The arrangement shown in FIG. 7b is similar to that shown in FIG. 7a except that the conduit 48 is not closed, but terminates in a spring loaded valve 49. The surplus oil pumped by the piston 20 after charging the metering units 14, passes through the valve 49. A non-return valve 50 is placed in the conduit 48 between the last of the metering units 14 and the valve 49 to prevent oil in the conduit 48 therebetween being sucked back into the chamber 19. Oil from the metering units passes back into the chamber 19 and the appropriate amount of fresh oil to completely fill the chamber 19 is drawn through the non-return valve 34. This particular arrangement of the apparatus relies on the accuracy of metering of the pulsator. If the displacemnt of oil from the chamber 19 is the same at each displacing stroke of the piston and fixed amounts of oil are abstracted by the metering units 14, it follows that the amount of oil discharged through the valve 49 is the same for each stroke.

In both the systems described with reference to FIGS. 7a and 7b a certain amount of oil is returned to the pulsator at the end of each pulse because it is a necessary part of the function of the metering units 14 that oil should be displaced in a return direction by the piston 43 so that the piston 44 can displace trapped oil to the bearing.

Figure 7C:
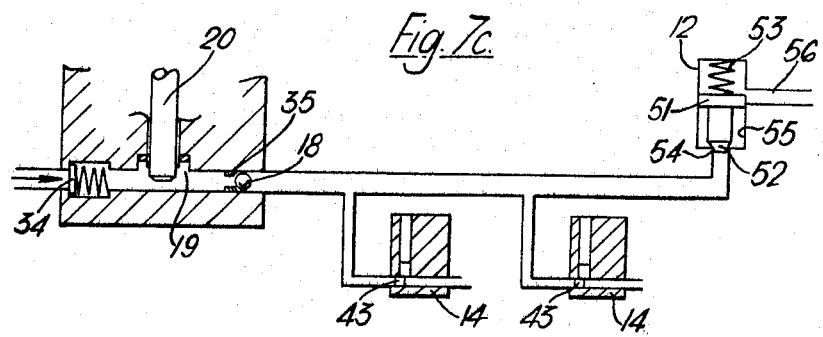

FIG. 7c shows an arrangement of the apparatus wherein the metering units do not return oil to the pulsator and all the oil displaced from the chamber 19 is fed to the bearings. In this case, the valve 49 of FIG. 7b is replaced by a two stage valve 12, also seen in FIG. 1, and the non-return valve 35 is placed in the oil outlet 18 of the pulsator. The two stage valve 12 comprises a piston 51 having a valve member 52 of smaller area, and spring urged by a spring 53 towards a valve seat 54. The piston 51 is fluid tightly slidable in a chamber 55 and when the valve member 52 is seated on the valve seat 54 it closes a passage 56 out of the chamber 55. Movement of the valve member 52 off its seat 54 exposes the passage 56 to the chamber 55. The spring 53 is of such a strength in relation to the springs 46 (FIG. 6) of the metering units 14 that the pressure of oil must be such to achieve the position shown in FIG. 6b in every metering unit 14 before the valve member 52 unseats. That is, all metering units must be charged before the valve member 52 opens. The pressure generated by the piston 20 of the pulsator must of course be sufficiently high to unseat the valve 52.

When the valve member 52 opens, it remains open by virtue of the pressure acting against the additional area now presented by the piston 51. The oil then discharges through the passage 56 urged by the action of pistons 20 and 43. When the pressure reduces, the two stage valve closes. No oil is taken back into the chamber 19 due to the presence of the non-return valve 35. The advantage of this arrangement is that all the oil discharged from the chamber 19 is distributed to the bearings and the oil piston 20 can thus be of minimum area. It will be appreciated that the greater the area differential between the plunger and the piston, the more reliable will be the apparatus.

FIG. 8 shows a further arrangement of the apparatus employing a modified pulsator unit and fuel pump. As in FIG. 1, there is provided a fuel tank 1, a fuel pipe line 2, an electrically driven fuel lift pump 57, a pipe line 4, a pulsator unit 58, a pipe line 6 and a carburettor 8. An oil tank 9 and an oil pipe 10 feed the pulsator unit 58, and an oil pipe 11 leaves the pulsator unit 58 and leads to a spring-loaded valve 49 already described with reference to FIG. 7b. A further form of metering unit 59 and a concentric tube, bleed-assisting device 60 are also shown.

The device 60 consists of concentric tubes in which the feed is through the inner tube 61 and the return is through the outer tube 62. This prevents an air lock from forming in the vicinity of the metering unit 59. The metering unit 59 consists of a pad or slug of felt or sintered porous material. Such a unit would meter oil at a slow rate and through it is not accurate, its errors would be small in terms of the total amount of oil fed by the pulsator.

The pulsator 58 is shown in cross sections in FIGS. 9, 10 and 11. The elements common to pulsator 58 and pulsator 5 are given the same reference numerals. A U-shaped leaf spring 63 is secured to the underside of the plunger (see FIG. 10), and extends through holes 64 alongside the chamber 19 into a switch chamber 65. Each end of the U-shaped leaf spring 63 is wrapped around one end of one of two rigid wire links 66. The other end of each wire link 66 is secured to a block 67 of insulating material. Through the block 67 there passes a copper rod 68 which is adapted to bridge two terminals 69 carried in a disc 70 of insulating material secured to the housing 16 by a spring clip 71. As the plunger 21 moves to the right as seen in FIG. 10, the bowed springs 66 pass overcentre and flip the block 67 to the left where the rod 68 makes bridging contact with the terminals 69. One terminal 69 is connected to a battery 72 (see FIG. 8) and the other to a terminal of the lift pump 57. Unless the terminals 69 are bridged the fuel pump cannot operate. When the terminals are bridged the fuel pump starts to lift fuel to the fuel inlet 27. This is normally blocked by a spring urged ball 73. When the ball is lifted by pressure of fuel in the inlet 27, it is held against a seating 74 formed on a sleeve 75 containing a spring 76 for the ball and positioned in the fuel outlet 28. The pressurized fuel forces the plunger 21 and piston 20 to the left as seen in FIG. 10, so that the piston displaces oil from the chamber 19 as previously described. As the plunger 21 nears the end of its leftward travel the wire links again go overcentre and the block 67 and rod 68 are flipped to the right thus breaking the electric circuit and stopping the fuel pump. When the fuel pump no longer delivers fuel to the chamber 26, the ball 73 blocks the fuel inlet 27 and permits the spring 32 to move the plunger 21 to the right to displace fuel in chamber 26 into the carburettor 8. Eventually, the plunger 21 moves far enough for the U-spring 63 to again move the bowed springs 66 overcentre to start the lift pump 57 and so repeat the cycle.

While the chamber 26 is being filled, the engine has to rely, for this short period, on the fuel in the carburettor. If this should be insufficient a small accumulator or reservoir 7 may be provided close to the carburettor 8 to inhibit any fuel starvation tendencies.

The advantages of the present system are that no mechanical drive is necessary and, if the system is employed for engine lubrication, the oil is metered in proportion to the power developed by the engine.

We claim:

1. A power plant comprising an internal combustion engine, having a liquid fuel system including a fuel intake connected to a source of fuel under pressure, a lubrication system for said engine independent of said fuel system and having a lubricant intake, a source of lubricant connected to said lubricant intake, a fluid pressure actuated lubricant supply metering means adapted to be actuated by said fuel under pressure flowing to said fuel intake at a rate proportional to the rate of flow of fuel to the engine and thus deliver lubricant to said lubricant intake at a rate of flow which is a predetermined function of the rate of flow of said fuel to the engine.

2. A power plant according to claim 1, in which said fluid pressure actuated lubricant supply metering means comprises a lubricant pump having a lubricant inlet and a lubricant output, and a motor having a fuel inlet and a fuel outlet, said pump being operable by said motor so as to deliver pulses of lubricant, and said motor being controlled by flow of said fuel under pressure.

3. A power plant according to claim 2, in which said lubricant pump comprises a pump body having a pump chamber in communication with said lubricant inlet and lubricant output, and a pump plunger reciprocable in said pump chamber so as to draw in a pre-determined quantity of lubricant on one stroke through said lubricant inlet and to expel said quantity of lubricant through said lubricant output on the return stroke, said pump plunger being driven by said motor.

4. A power plant according to claim 3, in which said motor comprises a motor body having a motor chamber in communication with said fuel inlet and fuel outlet, a motor plunger reciprocable within said motor chamber, said fuel inlet and outlet being disposed on the same side of said motor plunger, spring means within said motor chamber urging said motor plunger towards said fuel inlet and fuel outlet, said motor body being fixed relative to said lubricant pump body and said motor plunger being connected to said pump-plunger for reciprocation therewith, said plungers being movable in one direction by said fuel under pressure, and in the opposite direction by said spring means.

5. A power plant according to claim 4, in which there is provided control means for applying successive pulses of said fuel under pressure to said motor plunger, said control means being operable by movement of said motor plunger.

6. A power plant according to claim 5, in which said source of fuel under pressure comprises a fuel container and a fuel pump, and said control means is operable to stop and start said fuel pump.

7. A power plant according to claim 5, in which said control means comprises a valve at said fuel inlet and fuel outlet adapted to close said fuel inlet and open said fuel outlet when said motor plunger completes a stroke in said one direction and to open said fuel inlet and close said fuel outlet when said motor plunger completes a stroke in said opposite direction.

8. A power plant according to claim 2, including a metering unit intermediate said lubricant output on said flow co-relating means and said lubricant intake on said engine, said metering unit being adapted to pass a fixed proportion of the delivery of said lubricant pump.

9. A power plant according to claim 7, in which said metering unit is operable by said pulses of lubricant so as to divert a fixed proportion of the delivery of said lubricant pump, at least a part of the remainder of said delivery being returned to said lubricant pump.

10. A power plant according to claim 9, in which said remainder of said delivery is fed to additional metering units and/or to one or more spring loaded relief valves.

11. A power plant according to claim 2 including a metering unit intermediate said lubricant output from said lubricant pump and said lubricant intake comprising a housing, a first bore in said housing, a first piston fluid-tightly slidable in said first bore, an entry to said first bore in connection with said lubricant output and an exit from said first bore in connection with said lubricant intake, said entry and exit being disposed on opposite sides of said first piston, a first spring urging said first piston towards said entry, a second bore in said housing intersecting said first bore intermediate said entry and exit, a second piston fluid-tightly slidable in said second bore, a second spring urging said second piston towards said first bore, so that on the application of a pulse of lubricant from said lubricant pump to said first piston through said entry, said first piston is moved against the urging of said first spring to permit lubricant to enter said second bore and to move said second piston, and at the end of each pulse, said first spring moves said first piston initially to close said second bore at said intersection to trap lubricant therein and subsequently to pass said intersection and so to open said second bore to allow the trapped lubricant to be moved by said second piston under the influence of said second spring into said first bore and through said exit.

12. A power plant according to claim 11, in which said second piston is provided with stop means adjustable to regulate the quantity of lubricant trapped in said second bore during each pulse.

13. A power plant according to claim 12, in which said metering unit is provided with a plurality of said second bores.

References Cited
UNITED STATES PATENTS

| | | | |
|---|---|---|---|
| 1,059,943 | 4/1913 | Luethy | 123—196 |
| 1,201,038 | 10/1916 | Green | 123—196 |
| 1,385,250 | 7/1921 | Gernandt. | |
| 2,877,624 | 3/1959 | Zoller. | |
| 3,140,700 | 7/1964 | Nallinger. | |

HOUSTON S. BELL, JR., Primary Examiner

U.S. Cl. X.R.
103—50; 123—73; 137—99; 184—6, 29, 42